United States Patent [19]

Garcia

[11] Patent Number: 4,621,334

[45] Date of Patent: Nov. 4, 1986

[54] PERSONAL IDENTIFICATION APPARATUS

[75] Inventor: John D. Garcia, San Francisco, Calif.

[73] Assignee: Electronic Signature Lock Corporation, Berkeley, Calif.

[21] Appl. No.: 526,858

[22] Filed: Aug. 26, 1983

[51] Int. Cl.[4] .......................... G06F 1/00; A04Q 9/00
[52] U.S. Cl. ................... 364/550; 340/825.3; 340/825.31; 340/543
[58] Field of Search ............... 364/550, 576, 580; 340/825.3, 825.31, 825.32, 825.33, 825.34, 527, 528, 543

[56] References Cited

U.S. PATENT DOCUMENTS

| | | | |
|---|---|---|---|
| 3,643,219 | 2/1972 | Heimann | 340/172.5 |
| 3,798,605 | 3/1974 | Fiestel | 340/172.5 |
| 3,806,882 | 4/1974 | Clarke | 340/172.5 |
| 3,872,443 | 3/1975 | Ott | 340/172.5 |
| 3,958,081 | 5/1976 | Ehrsam et al. | 178/22 |
| 4,000,510 | 12/1976 | Cheney et al. | 340/172.5 |
| 4,028,733 | 6/1977 | Ulicki | 340/172.5 |
| 4,101,959 | 7/1978 | Demike et al. | 364/200 |
| 4,107,775 | 8/1978 | Ott | 364/413 |
| 4,197,524 | 4/1980 | Salem | 340/825.31 |
| 4,206,315 | 6/1980 | Matyas et al. | 178/22 |
| 4,229,818 | 10/1980 | Matyas et al. | 375/2 |
| 4,246,638 | 1/1981 | Thomas | 364/200 |
| 4,455,588 | 6/1984 | Mochida et al. | 340/543 X |
| 4,499,462 | 2/1985 | Stoesser et al. | 340/825.64 |

OTHER PUBLICATIONS

Saltzer, J., "The Protection of Information in Computer Systems", *Proceedings of the IEE*, vol. 63, No. 9, Sep. 1975, pp. 4.13–4.43.

Sedgwick, G., "The Body Code Machines", *The World*, Jan. 9, 1983, pp. 9–10.

"Combination Lock", *Hobby Electronics*, vol. 3, No. 12, Oct. 1981, pp. 21–23.

*Primary Examiner*—Felix D. Gruber
*Assistant Examiner*—H. R. Herndon
*Attorney, Agent, or Firm*—Limbach, Limbach & Sutton

[57] ABSTRACT

A method and apparatus is disclosed for verifying whether a particular individual is a member of a predetermined group of authorized individuals. The subject apparatus is particularly suited for controlling access to a secure resource such as a computer network or data base. In accordance with the subject invention, time delays are measured between successive strokes of a keyboard as the individual enters his name. A timing vector, which is constructed from the time delays, is statistically compared with a stored timing vector derived from the authorized individual. If the timing vectors are statistically similar, the individual will be permitted access to the resource.

24 Claims, 1 Drawing Figure

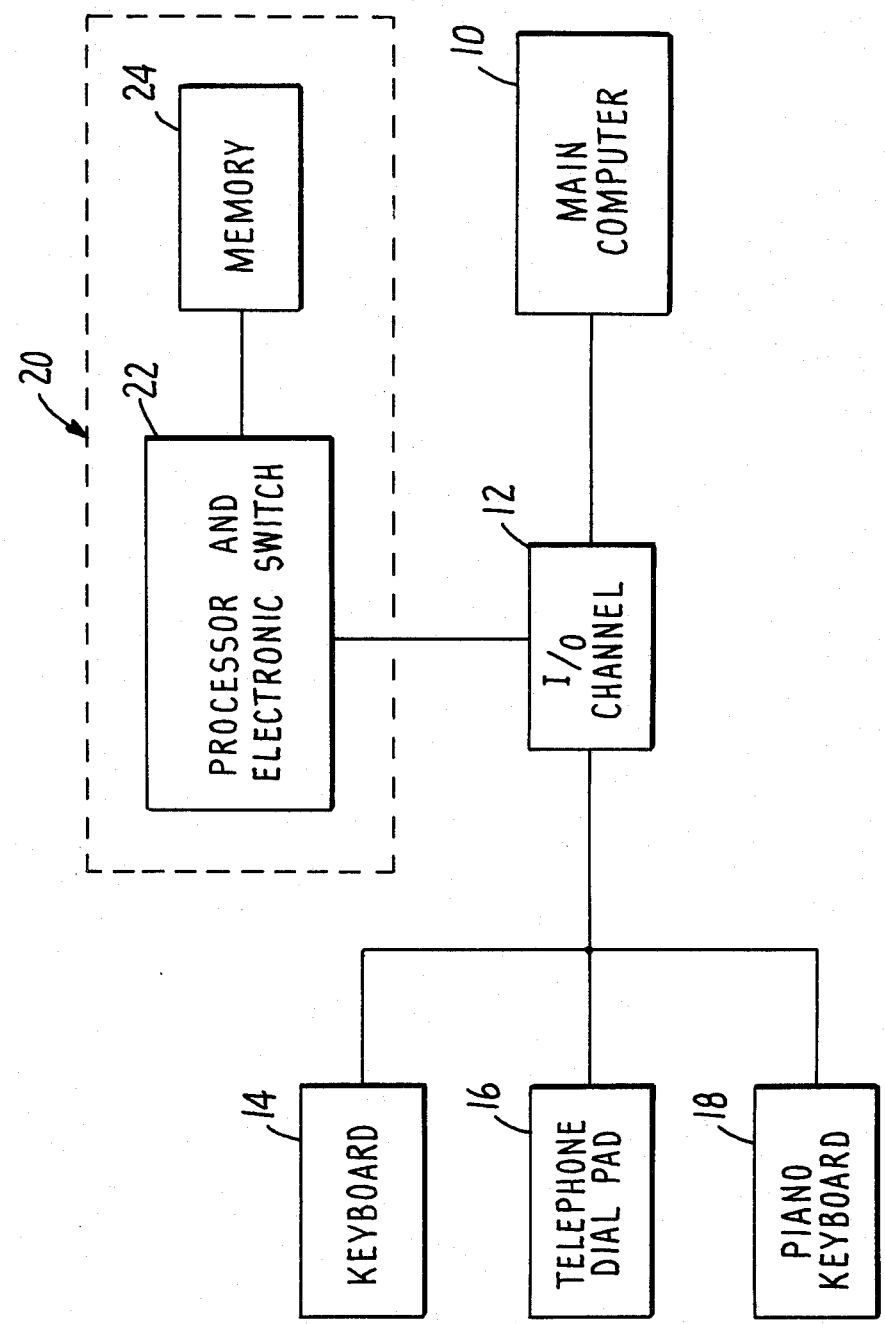

PERSONAL IDENTIFICATION APPARATUS

TECHNICAL FIELD

The subject invention relates to an apparatus for verifying whether a particular individual is a member of a predetermined group of authorized individuals. In accordance with the subject invention, time delays between successive input operations performed by an individual are recorded and statistically compared for verification. The subject apparatus and method are particularly suited for protecting a valuable resource such as access to a computer network.

BACKGROUND OF THE INVENTION

In recent years, a number of verification systems have been implemented for use with protected resources. For example, a bank having automatic teller machines will issue its customers a personal identification number (PIN) along with an access card. The PINs of each user are stored in the central memory of the computer controlling the automatic teller machines When the customer wishes to withdraw cash, he inserts his card and enters the secret PIN number through a keyboard. The computer compares the entered PIN with the stored PIN associated with the account number and determines whether to approve the transaction.

There are many difficulties encountered in the use of PIN systems. For example, as these systems become more prevalent, a user would be required to memorize many different PINs for each activity. Furthermore, customers frequently store their PINs in their wallet, such that if the wallet is lost, a criminal could use the card and PIN number to access the protected resource. Accordingly, there is considerable interest in developing personal identification systems which are unique to the individual and can not be utilized by a criminal even if the basic information were known.

One example of a unique personal identification system being developed concerns dynamic handwritten signatures. More particularly, when an individual signs their name, information can be derived based on both the downward pressure of the stylus of the pen and the x and y motions generated during the signature. This information can be stored for comparison with a later attempt to gain access to the resource The principal advantage of dynamic signature verification is that a criminal having access to the finished product (i.e., the signature) cannot duplicate the same dynamic actions which generated that signature.

Unfortunately, there are a number of shortcomings with dynamic signature verification which are preventing its widespread implementation. For example, sophisticated electronic input devices are necessary, such as a special digitizing pad or electronic stylus, in order to record the dynamics of the handwriting. Furthermore, the manner in which individuals sign their names varies quite drastically. Thus, the key elements in each signature, which are studied for verification, must be adapted and modified based on the person to be evaluated. This requirement places a large burden on the processing equipment designed for handling signature verification. Therefore, it would be desirable to provide a personal identification system which could be broadly utilized and requires only relatively simple and existing input devices.

Accordingly, it is an object of the subject invention to provide a new and improved personal identification apparatus.

It is another object of the subject invention to provide a new and improved personal verification apparatus where data can be entered through simple, existing input devices.

It is a further object of the subject invention to provide a new and improved personal identification apparatus where data is input through a keyboard It is still another object of the subject. invention to provide a new and improved personal identification apparatus which relies on measuring the time delays between successive input operations of an individual through a keyboard.

It is still a further object of the subject invention to provide a new and improved personal identification apparatus wherein input data is statistically analyzed in a manner for maximizing performance.

It is still another object of the subject invention to provide a new and improved personal identification apparatus wherein the parameters relating to access to the resource can be tailored based on the consistency of the individual's input operations.

SUMMARY OF THE INVENTION

In accordance with these and many other objects, the subject invention provides for a new and improved personal identification apparatus, particularly suited for controlling access to an electronic resource, such as a computer network. The identification apparatus is designed to provide selective access to the resource to authorized individuals. The apparatus takes advantage of the fact that most computer interfaces include some form of key pad or keyboard. Thus, the apparatus of the subject invention can be utilized merely by interposing the device between the keyboard driven input device and the main computer and controlling the input/output channel therebetween.

In accordance with the method of the subject invention, the time delays between successive input operations on the keyboard are used to differentiate between authorized and unauthorized personnel. More specifically, an authorized individual will create a data base by typing in character sets or phrases. Preferably, the individual's name is used. The data base is derived as a function of the time delays between each successive letter input on the keyboard To create the initial data base, the user will type in his name a number of times and a mean value will be stored. At a later time, when the user attempts to access the system, the individual will again type in his name. A timing vector is generated based on measured time delays The timing vector is statistically compared to the mean values stored in memory. If the input data is statistically similar with the stored data, the individual will be granted access to the resource.

The subject invention also includes improved methods for statistically handling the timing vectors in order to maximize the effectiveness of the device. The statistical analysis, which will be discussed in detail below, permits the authorization parameters to be varied based on the consistency of the individual's typing. Furthermore, the system includes a method of adjusting the error rate to any desired level.

Further objects and advantages of the subject invention will become apparent from the following detailed description taken in conjunction with the drawing in which:

BRIEF DESCRIPTION OF THE DRAWING

The sole FIGURE is a schematic block diagram of a suggested arrangement of elements for use in protecting a secure resource in accordance with the objects of the subject invention.

DETAILED DESCRIPTION OF THE PREFERRED EMBODIMENT

Referring to the sole FIGURE is illustrated an arrangement for implementing the method and apparatus of the subject invention. More particularly, the subject invention is intended to be used to protect a secure resource, such as a computer network 10. While the arrangement is shown in combination with a computer network, other resources may be protected, such as secure areas through door locks. Access to computer system 10 is through an input/output (I/O) channel 12. Typically, each input device passes through a separate I/O port or channel, although only one channel is shown for clarity.

Connected to the I/O channel are input devices such as a cathode ray tube with an attached keyboard shown schematically at 14. In addition, access to computer resources can also be obtained through telephone dial pads 16. As discussed below, a musical keyboard 18 may also be used as an input device. A single on-off switch or telegraph key can also be used.

Presently, access to computer systems is often controlled through the use of passwords. More particularly, each user is assigned a specific password which is stored in the memory of the computer. When the operator wishes to gain access to the system, he types an identifier (his name) and the password, which is then compared in the main computer to determine if access will be permitted. As can be appreciated, the system can be easily defeated when an unauthorized user obtains the password of an authorized user. This shortcoming has led to many computer fraud problems. Accordingly, the subject invention has been designed to limit access to computer resources to authorized individuals.

This object is achieved by providing an apparatus 20 which controls the operation of the I/O channel. The personal identification apparatus 20 includes a processor and electronic switch 22 for handling the system operation and a separate memory 24 for storing the data base on authorized individuals. Preferably, memory 24 is defined by a bubble memory or disc.

Briefly, in operation, an individual wishing to gain access to the computer will type in an identifier, such as his name, through one of the input devices 14, 16 or 18. The time delays between each successive key stroke is measured and recorded. The time delays may be measured either by counting the number of CPU cycles of the processor 22 or by measuring the actual time elapsed by an associated real time clock or timing chip. The string of timing delays in the user's name will define a timing vector. This timing vector is then compared with stored data recorded earlier by the user and forming a part of the data base. If the timing vector input through the key pad is statistically similar to the data stored in memory, the I/O channel 12 will be opened for communication between the key pad and the main computer. If the information is not statistically similar, the individual will be denied access to the resource.

The subject system is based upon the concept that the coordination of a person's fingers is neurophysiologically determined and unique for a given genotype. Any situation in which a person has to reproduce a rapidly changing pattern on one or more keys will produce the unique signature in terms of the time delays between each key pressed. This fact can be used to distinguish between genetically different individuals by means of the personal identification system of the subject invention.

As pointed out above, the keyboard can be any of a variety of input devices, such as a typewriter standard or a touch-tone telephone pad. In addition, a numeric key pad, a single telegraph key or even an electric piano or organ could be used. The only critical feature is that each successive piece of information input into the system be distinct and measurable relative to any timing base with a resolution between 1 and 500 microseconds. Preferably, a timing resolution on the order of 10 microseconds is utilized.

In practice, it has been found that the best data is derived when an individual types his own name. Apparently, the degree of familiarity and the emotional involvement of the input contribute to the stability and uniqueness of the electronic signature. Furthermore, a person's own name is the easiest password to remember. While the use of the individual's name is suggested, various other input systems may be used as discussed more fully hereinbelow.

In order to create a good statistical data base on each individual for storage in the memory, it is necessary to have the individual type his name a number of times to obtain an average input. Furthermore, through experimentation it has been shown that a training period is desirable, prior to actual recordation of data, to permit the signature to stabilize. This training period will vary significantly based on the typing expertise of the individual. For example, an expert typist will need only a few trials to get comfortable and produce reasonably similar input signatures. In contrast, a one finger typist will take significantly longer to build up to a reasonably consistent pattern for generating a usable data base.

Even with the institution of a training system, it should be apparent that the input signals generated each time a user types his name will vary to some degree. Furthermore, where a poor typist is involved, variations can be quite substantial. Therefore, in the preferred embodiment of the subject invention, a unique statistical approach is utilized which defines a function indicating the relative consistency of the individual. By using this statistical approach, discrimination between individuals is greatly enhanced. Furthermore, the error rate of the device can be accurately controlled.

In any personal identification system there are two errors which must be considered. The first error is the denial of access to an authorized individual. This error is not too serious and can be remedied by having the individual enter their name another time or times. The second error is permitting access to a nonauthorized individual. Obviously, this is a far worse error and must be severly constrained.

The parameters of acceptable error will vary from system to system. For example, where the resource is being protected merely from theft of services, and contains no secure data, the parameters can be fairly liberal. In contrast, where the computer network contains highly sensitive and secure information, the parameters must be strictly set. In the latter case, an authorized user who was not a particularly consistent typist may be required to enter their name four or five times before gaining entry. This repeated entry is acceptable in a situation where absolute security must be maintained.

During the generation of the base characterizing data on an individual, it is also desirable to remove any outliers. In this disclosure, an outlier is defined as a given input vector which is quite different from the normal vectors supplied by the individual. For example, if during the process of entering a name, a door is slammed or some other distraction takes place, the timing vector will be quite different than normal and could significantly alter the mean data base. Therefore, it is suggested that during the creation of the data base, any outliers are removed.

Various approaches for the removal of outliers will be discussed in detail below. It should be appreciated, however, that the best technique for providing an accurate data base is to control the surroundings for the initial entrys, such that distractions will not occur. Thus, when the user is first entering his name to create the data base, a quiet, secure setting is recommended.

The operation and statistical analysis of the subject invention will now be discussed in detail. For purposes of simplicity, it will be initially assumed that the input data is the user's name. As discussed below, other input data are also possible.

The data base or "electronic signature" is recorded by typing the individual's name n number of times. The time delays between each successive key stroke are recorded. These time delays include the spacing between every letter and between every space in the name of the individual. The result of each entry creates a $i^{th}$ timing vector, where $V^i$ is equivalent to $(v_1^i, v_2^i, v_3^i \ldots, v_m^i)$. Note that $v_1$ corresponds to the time delay between the first and second letter, $v_2$ between the second and third letter and so forth.

The next step is to calculate a mean signature timing vector $\overline{V}$, which is the mean of each time delays represented as follows:

$$\overline{V} = \frac{1}{n} \sum_{i=1}^{n} (v_1^i, v_2^i \ldots v_m^i)$$

The mean timing vector $\overline{V}$ is stored with the user's name. In its simplest form, an individual attempting to gain access to the system could enter his name which would be compared to this mean timing vector $\overline{V}$. If the newly typed vector and the mean are statistically similar, the user would be granted access to the system. However, the latter approach would not give any indication of the consistency of the operator, nor will it give a measure of how the input signature compares with the user's normal variations.

Therefore, in accordance with the subject invention, the preferred statistical approach is to utilize the Mahalanobis distance function. The Mahalanobis distance function gives a measure of how statistically similar an individuals given input operation is to his general pattern, weighted by his overall consistency. The Mahalanobis distance function is given by the following equation:

$$MD = (\overline{V} - V_0) \hat{C}^{-1} (\overline{V} - V_0)$$

where MD equals the Mahalanobis distance function between the recorded and stored electronic signature base and a given trial or timing vector. $\overline{V}$, as discussed above, is equal to the mean timing vector. Preferably, all outliers have been removed, as discussed below. $V_0$ is any given timing vector for a standard message (i.e., name). Finally, $\hat{C}^{-1}$ represents the inverse of the empirical covariance matrix.

The Mahalanobis distance function and the covariance matrix are well known in the statistical literature. (For example, see *The Advanced Theory of Statistics*, Vols. I-III, Maurice Kendall and Alan Stuart, Hafner, New York, 1961, and *Introduction to Multivariate Analysis*, T. W. Anderson, John Wiley and Sons (1958)). Briefly, the empirical covariance matrix represents a measure of the variation of each timing vector component with any other timing vector component. Thus, the matrix gives an indication of the consistency of the individual. For example, where a person is very consistent, the values in the covariance matrix would be quite small, approaching zero. In contrast, for an inconsistent typist, the covariance matrix values would be quite large.

Returning to the equation defining the Mahalanobis distance function, it will be seen that the covariance matrix is inverted and multiplied by the difference between the mean timing vector $\overline{V}$ and a given timing vector $V_0$ (for example, the input from an individual attempting to gain access to the computer). The term $(\overline{V} - V_0)$ is repeated twice because multiplication is not communicative in vector mathematics.

In the case of a consistent typist, the empirical covariance matrix values are small. Thus, when the inverted covariance matrix is multiplied by a given difference between the mean timing vector and the input vector $(\overline{V} - V_0)$, the Mahalanobis distance function, which is a scaler value, will be larger than for a poor typist. Accordingly, even small variations made by an accurate typist will become relatively important using this statistical analysis.

In contrast, an inconsistent typist given the same difference between the mean timing vector and the input signal $(\overline{V} - V_0)$, will produce a small Mahalanobis distance value, because his empirical covariance matrix has larger values. This flexibility in the system allows the statistical analysis to take into account the consistency of each individual typist. Intuitively, the system is designed to accept greater variation from an inconsistent typist than a consistent typist. Otherwise, it would be extremely difficult for an inconsistent typist to utilize the system. The error rates of the system, however, are strictly maintained by governing the size of the Mahalanobis distance function which will be accepted for any given individual. From preliminary trials, it has been found that, on the average, if an entry by an authorized individual has a Mahalanobis distance function value of 50 or less, he can be immediately authorized. In contrast, if the Mahalanobis distance function value is greater than 100, he should be rejected.

If the MD value falls between 50 and 100, then the user will be required to reenter his name. The values described above, namely, 50 and 100 are defined as the subcritical and critical values, respectively. This information is stored in the memory 24 along with the name of the individual, the mean timing vector and the calculated inverted covariance matrix. All the above information should be calculated at the time the data base is generated, such that the processing of data necessary at the time an authorized individual is attempting to gain access can be kept to a minimum.

The calculation of the critical and subcritical values enable the operator of the system to accurately control the error functions of the system. Clearly, where the MD subcritical value is set high, authorized users will be able to get on quite easily, however, the acceptance of unauthorized individuals may rise to an unsatisfactory level. Therefore, by properly adjusting the critical and subcritical values, error rates can be adjusted. Through experimentation, it has been found that, on the average, where the numbers 50 and 100 are chosen, the probability of an unauthorized individual gaining entry on the first trial is on the order of 0.0001 but may in practice be even less. Furthermore, the probability of an authorized individual being denied access is on the order of 0.5. At this level, an authorized individual may have to enter his signature two times in order to gain access.

The critical and subcritical values can be calculated relatively easily if input data stored on the individual approximates a normal distribution. In the latter case, the MD function can be approximated by a chi square distribution, which can be used to calculate the critical and subcritical parameters.

As these values are tightened to restrict access, an authorized user may have to enter his name a number of times to be successful. In accordance with the subject invention, these subsequent entries are not evaluated independently, but, are combined in a manner to determine if the overall entries are statistically similar to the individual's consistency patterns or whether they tend to deviate. Thus, the more frequently an authorized user enters his name, the closer he will come to an acceptable value. In contrast, an unauthorized user will move steadily away from an acceptable value. As pointed out above, in high security situations, the requirement for multiple entries is tolerable.

The analysis of multiple entries is accomplished using the following equation:

$$MD_2 = (\overline{V}2 - V_{02}) C_2 - 1 (\overline{V}_2 - V_{02})$$

In this case, the mean signature timing vector $\overline{V}_2$ is defined as follows:

$$\overline{V}_2 = (v_1, v_2 \ldots V_m, v_1, v_2 \ldots v_m)$$

In this definition the mean timing vector $\overline{V}$ is repeated twice in sequence, corresponding to the two trial entries. $V_{02}$ is defined by the two timing vectors, in the order of the entry. Thus, $V_{02}$ is expressed as follows:

$$V_{02} = (V_1^1, V_2^1 \ldots V_m^1, V_1^2, V_2^2 \ldots V_m^2)$$

Thus, each timing vector for each entry is compared to the mean ($\overline{V}$) and is multiplied by the inverted covariance matrix to derive an MD function which is a composite of the multiple entries. For greater than two entries, the mean timing vector $\overline{V}$ and entry vector $V_0$ are similary expanded. In this manner, as the number of entries that are made by the individual increase, the accuracy of the analysis of his identity is enhanced. In the preferred embodiment, if multiple entries continue to deviate from the expected values, an intruder alarm can be activated.

As pointed out above, it is desirable to remove any outliers from the basic data. There are a number of statistical techniques for rejecting outliers. In the preferred embodiment, outliers are filtered using a spectral analysis. Typically, any input vector from a user might not vary more than approximately 20 percent from the mean. On the other hand, outliers might vary from the mean on the order of 500 to 5,000 percent.

In order to calculate if their given input timing vector is an outlier, all vectors can be analyzed and their MD function calculated. Thereafter, a spectral analysis is made on all the MD's in a manner to identify any "discontinuity," wherein upper values of the MD's create a significant change in the slope of a periodic function. If there is any discontinuity at the upper levels, then the suspect timing vector is eliminated and the data base is recalculated.

A discussion of the use of spectral analysis to remove outliers can be found in *The Advanced Theory of Statistics*, cited above, and *Harmonic Analysis*, by Loomis. Through complex techniques, it is also possible to adjust individual time delays in a given timing vector to bring the entire vector in line with the mean. Other techniques for removing outliers include filtering by testing for the fourth moment, the EM algorithm by Demster, Laird and Rubin as reported in *Annals of Mathemathical Statistics*, or Huber's Robust Covariance Method for rejecting multi-variant outliers as reported in *Robust Statistics*, P. J. Huber, John Wiley and Sons (1981).

While the preferred embodiment of the subject invention utilizes the Mahalanobis distance function, other non-parametric techniques can be used. For example, the Kendall Rank correlation test, also known as the Kendall T test, can be implemented. (See *The Advanced Theory of Statistics*, cited above.) The Kendall T test normally has less power than the MD function, but if the deviations from the normalities for the set of vectors filtered for outliers is sufficiently large, then the Kendall T test discriminates better than the MD function. Because the actual values of the time delays between the key strokes would not be used, but only their relative ranks, the Kendall T test or other non-parametric, multi-variate techniques are invariant to the keyboard used. The latter criteria may be important in some systems.

In addition to the nonparametric or distribution free techniques that might be tried, there are several other parametric techniques for discriminating, such as the Kullbach P test and the Fisher Likeness coefficient test. However, if an outlier rejection algorithm is found which leaves the data normally distributed, then these other parametric tests will not be necessary because the MD function, with its enhancements, is the best discrimination function possible.

In the above disclosure, it has been assumed that the data base will be generated from multiple entries of a unique password and access to the system is obtained by entering the same password. This approach can be referred to as simple discrimination. A more intricate approach which can be implemented is characterized as complex discrimination. Complex discrimination is based not on a typing pattern derived from a specific message, but on a mathematical model which predicts a priori a person's typing pattern for any given message, even if it never has been typed before.

In order to utilize the complex signature, it would be necessary for the individual to type out at least 1,000 of the most common words in the English language. The words would be presented in a series of constrained phrases, randomly generated by a standard parser program that assures that verbs, nouns, adjectives and prepositions are in correct, grammatical order. The parser would produce at least 10,000 random phrases stratified such that each of the 1,000 basic words is typed at least 10 times by the individual recording the complex signature. The distribution and the time delays in the characters in each word and between all pairs of words as a function of word order is determined empirically, assuming normality, but not independence. After filtering outliers as previously discussed, the expected pattern of time delays and the covariance matrix for any given phrase can then be estimated and an a priori inverted covariance matrix generated through a least squares error approximation method. The raw data consisting of multivariate distribution parameters for each word and for delays between words as a function of word order represents the person's complex electronic signature or data base.

For discrimination, a random phrase is generated by the same parser program that was used to generate the complex signature. This phrase is then displayed on a remote terminal when the user requests access to the system. The user must then retype the phrase, such that a timing vector, analogous to the standard timing vector used for simple discrimination, may be generated. The Mahalanobis distance function, between the complex signature and the new vector, is then calculated to determine if they are statistically similar. If statistical similarity is shown, the individual is permitted access to the resource.

As pointed out above, many different message types can be used other than an individual's name. For example, tunes or melodies can be used, and the time difference between each input stroke on a music keyboard or even a typewriter keyboard can be measured. In all cases, the basic inquiry is the measurement of the time delays between individual input operations by the user.

In many computer networks, the data keyboard is physically connected to the computer providing no opportunity for a criminal to intercept communications. However, in some situations the input device may be physically separate from the computer and connected over a communication line. In the latter case, there is a possibility for tapping of the line to gain access to the system. For example, a criminal could tap the line used by an authorized individual and record the electronic access information which is entered. This information could be played back at another time to gain access to the system.

There are a variety of anti-tapping measures available in the prior art, all of which would be suitable for use with the subject invention. Another approach can include a request by the processor to the user to type in a set of letters, either before or after the main signature input. The set of letters are generated randomly and uniquely for each time the individual attempts to gain access. They can be supplied to the user through a CRT or typewriter. Since the entry sequence will vary each time a user tries to initiate a dialogue, a previously recorded successful entry sequence would not be adequate to gain subsequent access to the system. This approach would not be necessary if the complex signature was being utilized since the entire access message is generated randomly each time. Therefore, a recorded and replayed message could never be used to gain access to the network.

The processor of the subject may be defined by a number of commercially available chips. For example an Intel 8086, 16 bit microprocessor, along with an Intel 8087 math co-processor, can be utilized. 256K of ROM for holding the operating instructions and 256K of RAM are sufficient. As can be appreciated, the specific structure of apparatus can be varied within the scope of the subject invention, wherein time delays between successive input operations of the user are used for discrimination.

In summary, there has been provided a new and improved apparatus and method for verifying whether a particular individual was a member of a predetermined group of individuals. The subject system includes a means for measuring the time delays between successive input operations of the individual to be identified. A timing vector is calculated based on a function of the time delays between the input operations. This timing vector is then compared with data characterizing the authorized individual which is stored in memory. If the input timing vector is statistically similar with the stored characterizing data, the user will be permitted access to the system.

While the subject invention has been described with reference to a preferred embodiment, various other changes and modifications could be made therein by one skilled in the art, without varying from the scope and spirit of the subject invention as defined by the appended claims.

What is claimed:

1. A method of verifying whether a particular individual is a member of a predetermined group, said method comprising:
    generating a first timing vector relating to an authorized individual as a function of the time delays between successive input operations by said authorized individual, said time delays being neurophysiologically determined and unique for each authorized individual;
    storing said a first timing vector;
    generating a second timing vector of an individual to be identified as a function of the time delays between successive input operations, said time delays being neurophysiologically determined and unique for each individual to be identified; and comparing the first and second timing vectors to determine the statistical similarity therebetween.

2. The method as recited in claim 1 used to control access to a resource further including the step of inhibiting access to said resource by said individual unless said first and second timing vectors are statistically similar.

3. The method as recited in claim 1 wherein said first and second timing vectors can be generated through multiple entries by the individual to be authorized.

4. The method as recited in claim 1 wherein said step of generating said first timing vector relating to an authorized individual further includes the removal of input operations which are strongly statistically dissimilar from any other input operation.

5. The method as recited in claim 1 wherein said step of generating said first timing vector further includes the computation of a covariance matrix.

6. The method as recited in claim 1 wherein said first timing vector which is generated is a function of the consistency of the authorized individual.

7. Personal identification apparatus comprising:
    means responsive to input operations supplied by an authorized individual, said means for measuring the time delays between successive input operations and deriving a first timing vector, said time delays being neurophysiologically determined and unique for each authorized individual;

means for dynamically generating a second timing vector of an individual to be identified based on the time delays between successive input operations, said time delays being neurophysiologically determined and unique for each individual to be identified; and means for comparing the first timing vector of the authorized individual with the second dynamic timing vector of the individual to be identified to determine the degree of statistical similarity therebetween.

8. An apparatus as recited in claim 7 wherein said means for dynamically generating the timing vectors includes a typewriter keyboard.

9. An apparatus as recited in claim 7 wherein said means for dynamically generating the timing vectors includes a numerical key pad.

10. An apparatus as recited in claim 7 wherein said means for dynamically generating the timing vectors includes a telephone dial.

11. An apparatus as recited in claim 7 wherein said means for dynamically generating the timing vectors includes a piano keyboard.

12. An apparatus as recited in claim 7 wherein said means for dynamically generating the timing vectors includes an on-off switch.

13. An apparatus as recited in claim 7 wherein said means for dynamically generating the timing vectors includes a telegraph key.

14. An apparatus as recited in claim 7 wherein said apparatus is used to control the access to a resource and wherein said apparatus further includes a means for inhibiting access to said resource unless said dynamic and authorized timing vectors are statistically similar.

15. An apparatus as recited in claim 7 further including a means for generating random letters to define a portion of the input operations by the individual to reduce the likelihood of fraud.

16. An apparatus for verifying whether a particular individual is a member of a
first and second timing vectors; and signaling means for signaling a verified condition whenever said first and second timing vectors are statistically similar. predetermined group of authorized individuals, said apparatus comprising:

means for storing a first timing vector derived from each authorized individual, said first timing vector being neurophysiologically determined and unique for each authorized individual;

second means for measuring the time delays between each input operation of the individual to be identified, said time delays being neurophysiologically determined and unique for each individual to be identified;

third means for deriving a second timing vector as a function of the time delays between the input operations of the individual to be identified;

comparison means for comparing the first and second timing vectors; and signaling means for signaling a verified condition whenever said first and second timing vectors are statistically similar.

17. An apparatus as recited in claim 16 wherein said means for dynamically generating the timing vectors includes a typewriter keyboard.

18. An apparatus as recited in claim 16 wherein said means for dynamically generating the timing vectors includes a numerical key pad.

19. An apparatus as recited in claim 16 wherein said means for dynamically generating the timing vectors includes a telephone dial.

20. An apparatus as recited in claim 16 wherein said means for dynamically generating the timing vectors includes a piano keyboard.

21. An apparatus as recited in claim 16 wherein said means for dynamically generating the timing vectors includes an on-off switch.

22. An apparatus as recited in claim 16 wherein said means for dynamically generating the timing vectors includes a telegraph key.

23. An apparatus as recited in claim 16 wherein said apparatus is used to control the access to a resource and wherein said apparatus further includes a means for inhibiting access to said resource unless said first and second timing vectors are statistically similar.

24. An apparatus as recited in claim 16 further including a means for generating random letters to define a portion of the input operations by the individual to reduce the likelihood of fraud.

* * * * *